United States Patent [19]

Rode et al.

[11] 4,355,613
[45] Oct. 26, 1982

[54] IGNITION ADVANCE TIMING SYSTEM

[75] Inventors: Melvin A. Rode, West Bloomfield; Alvin D. Toelle, Fenton, both of Mich.

[73] Assignee: The Bendix Corporation, Southfield, Mich.

[21] Appl. No.: 221,139

[22] Filed: Dec. 29, 1980

[51] Int. Cl.³ .............................................. F02P 5/04
[52] U.S. Cl. ..................................... 123/414; 123/417
[58] Field of Search ....................... 123/414, 416, 417

[56] References Cited

U.S. PATENT DOCUMENTS

| | | | |
|---|---|---|---|
| 4,068,631 | 1/1978 | Lombard et al. | 123/416 |
| 4,181,884 | 1/1980 | Shirasaki et al. | 123/414 X |
| 4,207,846 | 6/1980 | Borst et al. | 123/416 |
| 4,267,810 | 5/1981 | Wesemeyer et al. | 123/417 X |
| 4,273,089 | 6/1981 | Maier | 123/417 |

Primary Examiner—Tony M. Argenbright
Attorney, Agent, or Firm—Russel C. Wells

[57] ABSTRACT

An ignition advance timing system for generating the ignition signal or the injection signal in an engine utilizes both the advantages of an angular-based system and a time-based system. A tooth wheel (10) operatively connected to the crankshaft of the engine (26) having groups (14) of teeth (16, 22, 24) positioned thereon. Each group represents the angular range of ignition or injection for a particular cylinder. The angular space (29) between each group of teeth allows a microprocessor (12) to begin a computing period (36) free of any interrupt signals generated by the teeth in the wheel. The microprocessor determines the desired angle which is synchronized with the teeth in the wheel to find the closest advance angle and by means of a timer the desired angle is generated.

7 Claims, 3 Drawing Figures

IGNITION ADVANCE TIMING SYSTEM

This invention relates to ignition timing systems for internal combustion engines and more particularly for a microprocessor based ignition advance timing system.

Currently electronic ignition timing systems use two different approaches. One approach is the so-called time-based system. This system involves use of a single timing marker set at 0° advance. This marker is usually generated by a tooth on a wheel. The actual ignition advance is a time delay from this marker to the precomputed ignition firing point for the next cylinder. Because the delay is usually over a large angle (170° for a 10° advance on a 4 cylinder engine), a small error in rotational timing results in a large error in advance timing. For example, a 1% error in timing the 170° gives a 17% error in the 10° advance. The advantage of the time-based approach is that it can be implemented with currently available single chip microcomputers.

A second approach to ignition timing is the so-called angle-based system. This approach overcomes the accuracy problem discussed above by using multiple, equally-spaced teeth which generate several timing markers for each engine cycle. Thus, the advance angle is timed to the nearest tooth which is only a few degrees more advanced. For example, the nearest timing mark for a system using teeth 10° apart is never more than 10° away. This approach has the disadvantage that it is practical to implement only if custom integrated circuits are used. This is because the off-the-shelf circuits result in unacceptable complexity and microcomputers are too slow to handle the high interrupt rate generated by the multiple and evenly spaced timing marks which occur during each engine stoke.

U.S. Pat. No. 4,068,631 issued to Lombard et al, describes a counter-based electronic ignition control system which features a timing wheel having three indicia per ignition. The first indicia opens the incrementing input of an up-down counter causing the counter to count. The second indicia, representing the maximum advance angle, closes the incrementing input and opens the decrementing input to the counter. The signals from the clock, which were used to increment the counter, are, at the time of the second indicia, supplied to a programmable divider which is controlled by a spark advance angle computer and used to decrement the counter. When the counter equals zero, an ignition spark is generated.

U.S. Pat. No. 4,112,890 issued to Manger et al teaches a controlled ignition systems for an internal combustion engine to provide one or more ignition pulses for any ignition event. The system uses a cam having a lobe for each ignition event per revolution. Also taught is a cam having groups of lobes for each ignition event for controlling multiple firing of the spark plug. This is to ensure a better and more consistent burning of the mixture in the cylinder.

The technique represented by this disclosure makes use of the best features of both the angle-based and time-based approaches to ignition timing. The key element is the recognition that the microcomputer can handle the high interrupt rates generated by losely spaced timing marks if these interrupts occur only when the microcomputer has completed all of its computational tasks. This leads to the use of a toothed wheel having teeth only in the range where the spark can occur. This leaves the microcomputer free to compute without interrupts for a sufficient time to complete all essential computation. The microcomputer can then handle the high interrupt rate.

The system described herein, with the missing tooth wheel results in an improved microprocessor efficiency by allowing the microprocessor to have interrupt free time for computation. The teeth on the wheel generate signals which cause interrupts to the microprocessor which, when not wanted cause delays in computation, therefore the gap between the groups of teeth will allow interrupt free computation.

DETAILED DESCRIPTION

Figure 1:
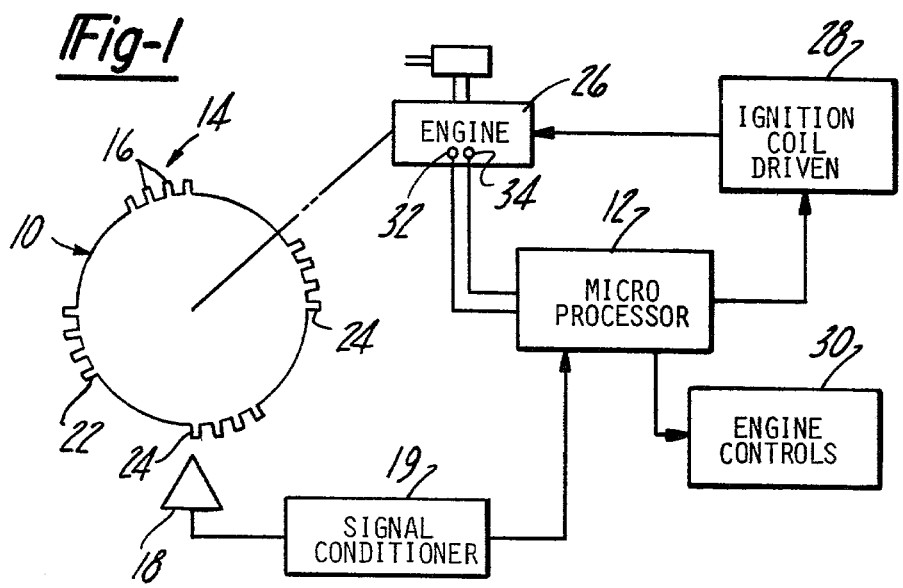
FIG. 1 is a block schematic of the ignition advanced timing system.

Most ignition timing problems occur during engine start conditions, acceleration, deceleration, and all other times when the speed of the engine is varying. As an example, during start conditions, the speed of the engine depends upon the speed of the starter motor plus the condition of the engine. At best it can be said that the speed is erratic. Therefore in prior art time-based systems, the actual time for an engine revolution is different from revolution to revolution and information taken one revolution may not be valid on the succeeding revolution which will, when applied to spark timing, cause either much advanced ignition or else ignition after the cylinder has reached TDC on the compression stroke. In either case the efficiency the engine is unacceptable. In the angle based system, when dealing with a multi-tooth wheel, the problem of each tooth generating interrupt signals to the microprocessor is present regardless of the engine speed and the computing efficency of the microcomputer is not utilized to its limits.

These two problem areas are addressed and solved by the following system using missing tooth or indicia wheel 10 and a microprocessor computing means 12 for combining the advantages of an angle-based system which identified the actual real time angle in the spark advance range with the accuracy of a time-based system to interpolate between the indicated angles. The time-based calculations are updated with the arrival of each tooth or indicia.

First, the angular position of the engine crankshaft or other engine operating shaft which is operatively coupled with the movement of the piston in the cylinder is determined. This is determined by a rotating wheel 10 having a plurality of groups 14 of teeth 16 angularly spaced around the periphery of the wheel such that the wheel may be described as a missing-tooth wheel. The teeth are sensed by sensing means 18 which is connected to a signal conditioner circuit 19 which operates to generate a pulse 20 in response to each tooth.

The spark advance angle is determined from a predetermined program stored in a microprocessor 12 in response to a plurality of engine operating parameters. The microprocessor 12 has a memory means and a computer means wherein the memory means contains a spark advance timing program which in response to certain engine operating signals will generate a computer signal indicating the spark advance angle for the next engine operating cycle. With the toothed wheel 10, a predetermined computer period is generated after the last tooth 22 of one group, the zero advance tooth, has been sensed and before the first tooth 24 of the next group of teeth is sensed. Each group 14 of teeth 16 represent the increments of advance for its respective cylinder. The first tooth 24 representing the maximum possible advance contemplated and the last tooth 22 represents zero degrees advance. Each tooth therebetween represents an equal angular distance between successive teeth. As an example, if the maximum advance is 30° and there are four teeth in each group, the angular distance between each tooth is ten degrees and the first tooth is 30°, the second tooth is 20°, the third tooth is 10° and the last tooth is 0°, all degrees are advance.

The program determines what the desired advance should be, where the advance falls relative to the teeth, i.e., the selected tooth, and then determines on a time basis the location of the desired advance for the selected tooth. This time value is determined from the rotational speed of the wheel and the angular difference between the selected tooth and the desired advance angle. This time value is initiated upon sensing of the selected tooth and at its termination the ignition signal is generated.

Thus, the spark advance timing system determines the angular position of the crankshaft of the engine 26; computes the desired spark advance angle depending on present engine operating conditions, identifies the nearest but farthest sensed advance angle for the desired cylinder, determines the rotational time from the sensed advance angle to the desired spark angle, and then outputs the ignition signal at the desired spark advance.

Referring to the figures for the characters of reference, there is illustrated in FIG. 1 a microcomputer or microprocessor based ignition advance system for determining the ignition timing advance in an internal combustion engine 26. As illustrated there is a missing-tooth wheel 10 operatively connected to the crankshaft of the engine. Position in a sensing relationship to the wheel is a sensor means 18 which responds to the indicia 16, 22, 24 of the wheel to generate electrical signals which are supplied to a microprocessor 12 along with signals of a plurality of engine operating perameter sensors. The microprocessor contains a stored program means wherein one of the programs stored therein is ignition timing, and one output of the microprocessor is to an ignition coil driver which drives the ignition coil in a spark ignited internal combustion engine or the injector coil in a compression ignited internal combustion engine.

Figure 2:
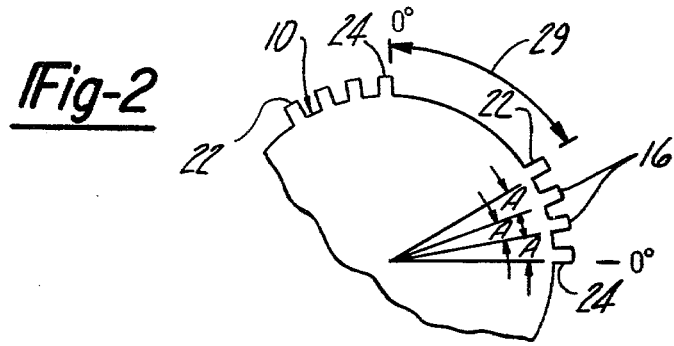
FIG. 2 is a partial plan view of the missing tooth wheel.

The timing wheel or disk 10 as illustrated in FIGS. 1 and 2 has a plurality of groups 14 of indicia or teeth 16, 22, 24 located thereon. Each group of indicia is angularly spaced 29 from the preceeding groups and all of the angles between groups are equal. The number of groups 14 correspond to the number of ignition events per revolution of the disk. As an example, as the timing disk is connected to the crankshaft of the spark ignited engine having four cylinders, the disk will have two groups of indicia and the groups are spaced 180° apart. The number of indicia in each group is equal and may be any amount of indicia from two or more. The limitation is a practical limitation consistent with manufacturing processes and the capability of the microprocessor to receive INTERRUPT signals.

As illustrated in the embodiment of FIG. 2, the number of indicia per group is four and each of the indicia in the group are equally spaced. When used in an ignition system, the end of the last indicia 22 of the group represents 0° advance whereas the beginning indicia 24 of the group indicates an angularly advance equal to 3A where A is the angular displacement between each indicia.

Located in close proximity to the timing disk 10 is a sensor 18 which responds to each indicia and generates an electrical signal which is supplied to a sensor condition circuit 19 for generating pulses that are suitable to be applied to a microprocessor 12. In particular, each pulse is a rectangular wave pulse.

Since this system is specifically found in an electronic controlled engine 30, the engine has position thereon several sensors which sense and generate signals in response to several engine operating conditions. In particular, there may be a temperature sensor 32 located in the cooling system for generating a signal indicating the temperature of the cooling system. In addition, there may be a pressure sensor 34 located in the intake manifold for generating a signal indicating manifold pressure. The sensor which responds to the timing disk generates signals indicating engine speed.

The microprocessor 12 may be an Intel 8048 microprocessor which has stored therein several resident programs, one of which is ignition control. The microprocessor during a computing period responds to the signals from the several sensors and is operative to work with ignition programming to generate a signal indicating the degree of ignition advance for each cylinder.

Figure 3:
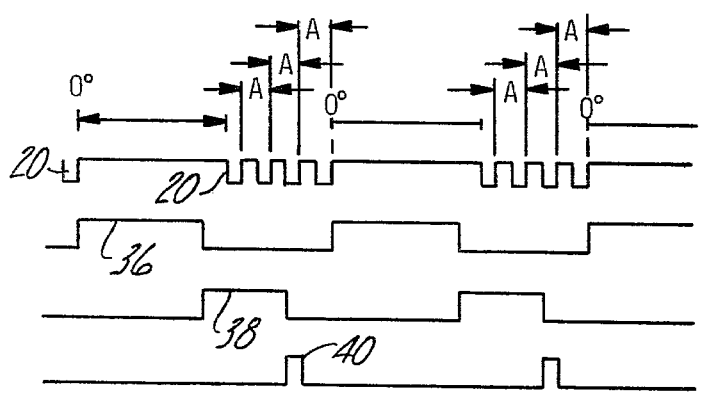
FIG. 3 is a timing diagram of the system of FIG. 1.

As illustrated in FIG. 3, there is a predetermined compute period 36 during which the microprocessor performs all of its computing functions. Particularly, this computing period begins at the end of the last indicia 22 of a group and ends before the first indicia 24 of the next succeeding group. The time length of this computing period 36 is determined by the calculation of the maximum engine speed that the engine will operate. During this computing period, due to the absence of indicia between the groups, there are no interrupt signals 20 supplied to the microprocessor. However, when indicia on the timing disk passes the sensor, a signal 20 is generated which functions as an interrupt signal to the computer.

During the computing period, the microprocessor generates the ignition signal and determines between which indicia the actual advance should be. The microprocessor then waits for the interrupt signal from the sensor and determines by the location of the interrupt signal which indicia is present. In the illustrated embodiment, the microprocessor will determine whether the ignition pulse should be energized is between indicia 1 and 2 is on or between indicia 2 or 3 or 3 or 4. Once this is determined, the microprocessor then responds to the indicia to begin a time interval to arrive at the actual angular position desired.

The time interval is also calculated in the miroprocessor at the same time the ignition signal is calculated. The miroprocessor is programmed to identify the angular rotation of each interrupt signal and from the engine operating perameter signals determines the calculated advance signal. Therefore, from two factors and the calculated advance signal the microprocessor determines exactly between which pair of indicia the ignition signal is to be generated and how far on a time basis the signal should be generated from an interrupt.

As illustrated in FIG. 3, at the end of the computing period 36 the ignition coil driver may be turned on and the engergy built up into the coil for subsequent energizing of the spark of an ignition system, or the coil of an injector. This is represented on the timing diagram of FIG. 3 at 38. At the end of this period 38, the ignition signal 40 is generated.

There has thus been described a missing-indicia or tooth timing wheel microprocessor-based ignition timing system which combines the best festures of an angular-based and a time-based system.

What is claimed is:

1. An ignition advance timing system for internal combustion engines combining angle-base and time-base ignition timing systems for generating an ignition signal, said system comprising:

a timing disk operatively coupled to the crankshaft of the engine, said timing disk having a plurality of equally and angularly spaced groups of indicia thereon, each of said indicia representing a known angular displacement from the last indicia in each of said groups, said last indicia representing zero degrees advance in ignition timing for one of the cylinders of the engine;

sensing means responsive to each of said indicia for generating an electrical signal;

a plurality of engine operating parameter sensors each operable for generating electrical signals indicating an engine operating condition;

a microcomputer means having a stored program therein responsive to said engine operating parameter signals for calculating ignition advance timing for each cylinder during a computing period initiated by said last indicia of the preceding group of indicia for calculating the ingition advance timing for such cylinder;

said microcomputer means further including means responsive to each of said indicia for generating an INTERRUPT signal to said mirocomputer means and operable to compare the known angular displacement of said indicia with said calculated ignition advance timing signal for determination if said advance timing signal is within the angular displacement before the next adjacent indicia and generate a comparison signal therefrom; and timing means responsive to said comparison signal and said calculated ignition advance timing signal for generating an interval at the end of which an ignition signal at the calculated advance between adjacent indicia is generated.

2. The system according to claim 1 wherein said timing disk is a wheel having a plurality of groups of teeth thereon each of said groups equally and angularly spaced around the periphery of the wheel.

3. The system according to claim 2 wherein each of said groups has a plurality of equally and angularly spaced teeth.

4. The system according to claim 2 or 3 wherein the number of groups of said teeth is equal to the number of spark ignition events in the engine during one revolution of the crankshaft.

5. The system according to claim 2 or 3 wherein the number of groups of said teeth is equal to the number of spark ignition events in the engine during one engine cycle.

6. The system according to claim 1 wherein said indicia or said timing disk are magnetically responsive areas and said sensing means responds to said magnetically response areas for generating electrical signals.

7. An ignition advance timing system comprising:

an angular-based timing means operatively connected to the crankshaft of an internal combustion engine and operative to generate spaced apart groups of timing signals, the number of said groups equal to the number of ignitions per engine cycle;

a timing means responsive to predetermined ones of said timing signals for generating a predetermined interval from said one timing signal;

a microprocessor adapted to be responsive to a plurality of engine operating perameters during a calculation period for calculating which one of said timing signals in each group is said predetermined one timing signal and for calculating said predetermined interval, said microprocessor responsive to the last timing signal of each group to initiate said calculation period which period is completed prior to the first timing signal of said succeeding group; and ignition coil driver means responsive to said predetermined timing signal and the end of said predetermined interval for operating the coil at the desired advanced angle with respect to the operation of the cylinder.

* * * * *